Patented Sept. 21, 1954

2,689,868

UNITED STATES PATENT OFFICE 2,689,868

PREPARATION OF AMINES

Jack T. Thurston, Riverside, Conn., assignor to American Cyanamid Company, New York, N. Y., a corporation of Maine No Drawing. Application June 9, 1950, Serial No. 167,257

8 Claims. (Cl. 260—563)

The present invention relates to the preparation of amines by the reaction of olefins with a cyanogen halide, followed by hydrolysis.

It is an object of the invention to react a cyanogen halide with an olefin containing an internal or substituted double bond in the presence of an acid catalyst followed by hydrolysis. Additional objects will be apparent from the discussion hereinafter.

It is known that hydrogen cyanide may be reacted with certain olefins as an initial step in preparing the corresponding amines. The hydrogen cyanide method, however, is subject to the disadvantage that the product obtained on hydrolysis of the HCN addition product is a formamide, and not an amine. This formamide must be separated and then further hydrolyzed before an amine can be obtained. It has been found that when cyanogen chloride is used instead of hydrogen cyanide, the amine is obtained directly in one hydrolytic step, and no formamide need be separated for a second hydrolytic step to prepare the final amine. It has been further found that in using the method of the present invention, the process is critical with respect to the olefin chosen. Olefins containing an unsubstituted terminal double bond such as octylene-1 or dodecene-1 are not suitable for the process. However, olefins that contain an internal or alkyl substituted double bond such as cyclohexene, butene-2, diisobutylene, propylene polymers, 2-methylbutene-1, and the like, are suitable.

The following example illustrates without limiting the invention.

EXAMPLE 1

*Preparation of Diisobutylamine*

To a mixture of 45 g. (0.4 mol) of diisobutylene and 24 g. (0.4 mol) of cyanogen chloride maintained at about 0°–5° C. in a 500 cc. 3-necked round-bottom flask, 40 g. (0.4 mol) of 96% sulfuric was added very slowly with vigorous stirring. The sulfuric acid is conveniently added by means of a 50 cc. squibb-type separatory funnel fitted to one of the side arms. A condenser is fitted to the other side arm, said condenser is conveniently a Friedrich-type condenser, through which is circulated a refrigerated methanol-water solution or other cooling solution. While it is not absolutely necessary, it is preferred that the open end of the condenser be joined to a calcium chloride drying tube or the like, and this successively joined to a suction flask used as a back-up trap, and the latter to a bubbler tube, extending almost to the bottom of a second flask containing sodium hydroxide solution, and the sodium hydroxide flask leading finally to a manometric U tube containing, for example dibutylphthalate. The center neck of the reaction flask is fitted with a rubber stopper through which is led a rubber sleeve-sealed stirrer, a thermometer extending almost to the bottom of the flask, and a glass tube connected to a Y tube which in turn leads to a source of nitrogen or other inert gas. The other lead from the Y preferably has a connection to fit into the neck of the squibb dropping funnel in order that the pressure might be equalized when liquid is added to the flask through the dropping funnel while a gas is being given off within the flask.

Numerous possible modifications in the above apparatus will be immediately evident to one skilled in the art.

Continuing now with the procedure, after the addition of sulfuric acid, nitrogen (or other inert gas) is run in as needed to prevent any sucking back in the traps. The temperature in the reaction flask is maintained between 10°–15° C. until the evolution of gases has almost ceased (1–2 hours) and then the reaction temperature is permitted to rise slowly to 50°–55° C., and it is maintained there for 15–30 minutes ordinarily by its own heat of reaction.

To prevent the formation of tars and by-products, the flask is then preferably cooled, say to 15° C., taking care that the flow of nitrogen is increased to prevent suck-back. To the thus cooled solution is then added 30 cc. of water, which causes evolution of additional hydrogen chloride. The aqueous mixture is then neutralized with alkali (for example 20% sodium hydroxide solution) until the solution is strongly basic. The organic layer, which contains the crude amine, is then separated and the aqueous layer extracted with multiple portions of a suitable solvent, for example, three times with 75 cc. portions of ether. The ether washings are added to the organic layer and the aqueous solution is discarded. The ether solution is washed with water (for example, with a 50 cc. portion) and then extracted with multiple portions of dilute acid (for example, five times with 60 cc. portions of 5% hydrochloric acid). The acid extracts are combined and made basic by the cautious addition of alkali, for example, 20% sodium hydroxide. The amine is extracted from the basic solution, as, for example, by three 80 cc. portions of ether. These are combined, dried over a good desiccant such as anhydrous potassium carbonate, and filtered. The ether is removed through a short column, and the amine distilled at atmospheric pressure. The yield of N - t - octyl - amine, $(CH_3)_3CCH_2CNH_2(CH_3)_3$, is 16.4 g., or 22% based on the starting olefin used. The ether solution from which the amine was extracted may be dried and filtered, and the ether removed and fractionally distilled to recover unreacted diisobutylene. In the above example 14 g. or 31% of diisobutylene was recovered unreacted.

Numerous modifications in the above process are possible and will be evident to those skilled in the art. Instead of adding the water to the reaction mass within the reaction flask, for example, the reaction mass may be poured into water or into base. Also, instead of neutralizing the acid hydrolysate with alkali before the ether extraction, the ether extraction may precede such neutralization.

Additional examples are summarized in Table I following:

The temperature used will depend largely on the cyanogen halide. If cyanogen chloride is used the temperature is preferably rather low, such as in the examples cited, in order to facilitate refluxing of cyanogen chloride, which boils at 12° C. Thus, when using cyanogen chloride the reaction temperature preferably should not exceed about 20° C. at atmospheric pressure. (Higher temperatures can be used under superatmospheric pressure.) However, when all the cyanogen chloride has been used up as indicated by the cessation of cyanogen chloride reflux, the temperature in the reaction flask may be increased, if desired, in order to accelerate the reaction. After cessation of gases, the reaction can be brought rapidly to completion by heating the mixture gently to just above 50° C., where in almost all cases, it will maintain itself until the reaction is complete. When using cyanogen chloride the preferred initial reaction temperature is within the approximate range 1°–15° C. At lower temperatures, for example at —10° C.,

TABLE I

*Acid catalyzed reaction of cyanogen chloride and olefins*

| Run No. | ClCN Moles | Catalyst | | Olefins | | Reaction Temp., °C.[2] | Amine [1] Percent [3] |
|---|---|---|---|---|---|---|---|
| | | Name | Moles | Moles | g. | | |
| 2 | 0.4 | 96% $H_2SO_4$ | 0.4 | None | | 5–12 | 96% As HCl |
| | | | | Cyclohexene | | | |
| 1 | 0.2 | 96% $H_2SO_4$ | 0.2 | 0.2 | 16.4 | not controlled | ca. 30 |
| 3 | 0.4 | do | 0.4 | 0.4 | 32.8 | 10–14 | 14.0 |
| 7 | 0.4 | 85% $H_2SO_4$ | 0.4 | 0.4 | 32.8 | 10–14 | 16.5 |
| 8 | 0.5 | 96% $H_2SO_4$ | 0.4 | 0.4 | 32.8 | 15–18 | 8.0 |
| 9 | 0.4 | 100% $H_2SO_4$ | 0.4 | 0.4 | 32.8 | 10–11 | 6.5 |
| 10 | 0.4 | 75% $H_2SO_4$ | 0.4 | 0.4 | 32.8 | 15–18 | 4.7 |
| 11 | 0.4 | 96% $H_2SO_4$ in 22 ml. $CH_3COOH$ | 0.4 | 0.4 | 32.8 | 20–30 | 7.2 |
| 12 | 0.8 | 96% $H_2SO_4$ | 0.4 | 0.4 | 32.8 | 15–20 | 15 |
| | | | | Diisobutylene | | | |
| 18 | 0.4 | $ClSO_3H$ | 0.4 | 0.4 | 45 | 10–15 | 2.2 |
| 19 | 0.4 | $FSO_3H$ | 0.4 | 0.4 | 45 | 10–12 | 6.8 |
| 20 | 0.4 | $CH_3SO_3H$ | 0.4 | 0.4 | 45 | 10–15 | 10.8 |
| 21 | 0.8 | 96% $H_2SO_4$ | 0.4 | 0.4 | 45 | 1–3 | 30.0 |
| 22 | 0.5 | $F_2PO_2H$ | 0.4 | 0.4 | 45 | 15–18 | 19.1 |
| 27 | 0.5 | 96% $H_2SO_4$ | 0.4 | 0.4 | 45 | —10 to —12 | 28.4 |
| | | | | Propylene Polymer, C–9.8 | | | |
| 16 | 0.4 | 96% $H_2SO_4$ | 0.4 | 0.4 | 55 | 10–15 | 27 |
| | | | | Butene-2 (cis+trans) | | | |
| 25 | 0.5 | 96% $H_2SO_4$ | 0.4 | 0.4 | 23 | —4+10 | 22.3 |
| | | | | 2-Methylbutene-1 | | | |
| 28 | 0.5 | 96% $H_2SO_4$ | 0.4 | 0.4 | 26.4 | 9–12 | 32.8 |

[1] Only amine was isolated unless otherwise indicated.
[2] Reaction temperature always raised to 50° C. to complete reaction.
[3] Based on starting olefin used.

Notes to Table I:                                       Run
HCl by titration_____    2
ClCN added to $H_2SO_4$+olefin at 15° C_____    8
25 ml. $CH_3$—COOH solvent added_____   11
25 ml. $CH_3$—COOH solvent added_____   12
1–3° C. for 4½ hours and then to 55° C_____   21
9 hours at —10° to —12° C. then heated to 45° C.
   and hydrolyzed in usual manner_____     27

As shown in run No. 2 in the preceding table, cyanogen chloride is almost quantitatively hydrolyzed by the acid catalyst, in the absence of olefin. It is therefore surprising that under the same operating conditions, any amine could be formed when an olefin is added.

In the above table, cyclohexene gave cyclohexylamine, butene-2 gave 2-aminobutane, and 2-methylbutene-1 gave 2-methyl-2-aminobutane.

In conducting the reaction it was found that vigorous stirring was needed to insure thorough contact of the reactants and to shorten the reaction time. Without adequate stirring it was found that the heavier sulfuric acid or other catalyst formed a layer at the bottom of the flask, and the site of the reaction thereby limited to the interface of the layers.

with their consequent longer reaction times, some of the cyanogen chloride tends to polymerize.

While the preceding examples used cyanogen chloride, the reaction may be run with other cyanogen halides, such as the bromide. When using cyanogen bromide (a solid), the material is conveniently dissolved in the olefin and the reaction conducted at room temperature, or if desired, at higher temperatures, for example in a water bath at 50°–55° C.

The reaction time is governed by two factors, namely the length of time necessary to add the acid catalyst, and the cessation of the vigorous evolution of gas. Usually the acid can be added over a period of 20–60 minutes, more or less, depending on the amounts used. After an additional hour or two, the mixture can be warmed to 50° C., where it is allowed to go to completion. The latter reaction usually takes about 30 minutes, more or less.

While a large variation in the molar proportion of reactants is possible, there is no operational advantage in using great excess of one reactant over the other. Under the preferred conditions, equimolar amounts of acid catalyst and olefin are used with about a 10% molar excess of cyanogen halide.

Various permutations of methods of mixing the reactants and catalyst are possible. However, it is preferred in general to add the acid catalyst to the olefin cyanogen halide mixture.

The efficiency of the acid catalyst is a function of its strength but it should not be too strong an oxidizing agent. An acid of strength about equal to 96% sulfuric acid is the preferred catalyst. 100% sulfuric acid can be used but is a stronger oxidizer agent and thus reduces the yield of amine. On the other hand, 75% sulfuric acid is too weak to give the best results. Chlorosulfonic acid, fluorosulfonic, and methane sulfonic acids give progressively larger yields of amine in that order, although none of these catalysts are as good as 96% sulfuric acid.

While the invention has been described with particular reference to specific embodiments, it is to be understood that it is not to be limited thereto but is to be construed broadly and restricted solely by the scope of the appended claims.

I claim:

1. The method comprising subjecting a member of the group consisting of olefins containing an internal double bond and olefins containing a terminal double bond carrying an alkyl substituent on the No. 2 carbon to the action of a cyanogen halide selected from the group consisting of cyanogen chloride and cyanogen bromide in the presence of a strong acid catalyst in a liquid phase reaction, followed by hydrolyzing the reaction mass thus formed, and recovering therefrom an amine.

2. The method according to claim 1 in which the cyanogen halide is cyanogen chloride.

3. The method according to claim 1 in which the cyanogen halide is cyanogen bromide.

4. The method according to claim 1 in which the catalyst is 96% sulfuric acid.

5. The method of preparing N-t-octylamine that comprises the steps of subjecting diisobutylene to the action of cyanogen chloride in liquid phase in the presence of a strong acid catalyst, hydrolyzing the thus-formed reaction mass, and recovering therefrom N-t-octylamine.

6. The method of preparing cyclohexylamine that comprises subjecting cyclohexene to the action of cyanogen chloride in liquid phase in the presence of a strong acid catalyst, hydrolyzing the thus-formed reaction mass, and recovering cyclohexylamine.

7. The method of preparing 2-aminobutane that comprises subjecting butene-2 to the action of cyanogen chloride in liquid phase in the presence of a strong acid catalyst, hydrolyzing the thus-formed reaction mass, and recovering therefrom 2-aminobutane.

8. A method of preparing 2-methyl-2-aminobutane that comprises subjecting 2-methylbutene-1 to the action of cyanogen chloride in liquid phase in the presence of a strong acid catalyst, hydrolyzing the thus-formed reaction mass, and recovering therefrom 2-methyl-2-aminobutane.

No references cited.